(12) United States Patent
Tanaka et al.

(10) Patent No.: US 12,555,389 B2
(45) Date of Patent: Feb. 17, 2026

(54) APPARATUS, METHOD, AND COMPUTER PROGRAM FOR ESTIMATING ROAD EDGE

(71) Applicant: WOVEN BY TOYOTA, INC., Tokyo (JP)

(72) Inventors: Masahiro Tanaka, Tokyo-to (JP); Mamoru Tsukamoto, Tokyo-to (JP)

(73) Assignee: WOVEN BY TOYOTA, INC., Tokyo (JP)

( * ) Notice: Subject to any disclaimer, the term of this patent is extended or adjusted under 35 U.S.C. 154(b) by 428 days.

(21) Appl. No.: 18/164,925

(22) Filed: Feb. 6, 2023

(65) Prior Publication Data
US 2023/0260294 A1   Aug. 17, 2023

(30) Foreign Application Priority Data
Feb. 15, 2022   (JP) .................. 2022-021424

(51) Int. Cl.
*G06V 20/56* (2022.01)
*G06T 7/13* (2017.01)
*G06T 7/70* (2017.01)

(52) U.S. Cl.
CPC .............. *G06V 20/588* (2022.01); *G06T 7/13* (2017.01); *G06T 7/70* (2017.01); *G06T 2207/30241* (2013.01); *G06T 2207/30256* (2013.01)

(58) Field of Classification Search
CPC ...... G06V 20/588; G06V 20/50; G06V 20/56; G06V 10/44; G06V 10/40; G06T 7/13; G06T 7/70; G06T 2207/30241; G06T 2207/30256; G06T 7/73; G06T 7/10; B60W 30/10; B60W 30/12; B60W 60/001;
(Continued)

(56) References Cited

U.S. PATENT DOCUMENTS 10,081,360 B2 *  9/2018  Hu ..................... B60K 35/00
12,159,465 B2 * 12/2024  Chen ................... G06T 7/12
(Continued)

FOREIGN PATENT DOCUMENTS

CN   107776573 A   3/2018
CN   108099907 A   6/2018
(Continued)

OTHER PUBLICATIONS

Lin; Qunshu et al. "SOR: Semi-Automatic Object Box and Road Element Annotation Pipeline", May 2025, IEEE (Year: 2025).*

*Primary Examiner* — Aaron W Carter
*Assistant Examiner* — Alejandro Hernandez
(74) *Attorney, Agent, or Firm* — Sughrue Mion, PLLC (57) ABSTRACT

An apparatus for estimating a road edge includes a processor configured to estimate a trajectory of a vehicle, estimate the position of an edge of a road from images generated during travel of the vehicle by a camera, identify an undetected section when an image from which the edge of the road is not detected was generated, determine whether the road in the undetected section has a structure with a road edge, estimate the position of the edge of the road in the undetected section, based on the positions of the edge of the road in the sections in front of and behind the undetected section, when the road in the undetected section has a structure with an edge, and omit to estimate the position of the edge of the road in the undetected section when the road in the undetected section has a structure without an edge.

9 Claims, 7 Drawing Sheets (58) Field of Classification Search
CPC ........ G01C 21/26; G01C 21/28; G01C 21/30; G01C 21/32
See application file for complete search history.

(56) References Cited

U.S. PATENT DOCUMENTS

| | | | | |
|---|---|---|---|---|
| 12,258,011 | B2* | 3/2025 | Yoshihama | B60W 30/12 |
| 2006/0210116 | A1* | 9/2006 | Azuma | G06V 10/48 |
| | | | | 701/1 |
| 2009/0012709 | A1* | 1/2009 | Miyazaki | G01C 21/3822 |
| | | | | 701/514 |
| 2009/0030613 | A1* | 1/2009 | Kataoka | G06V 20/588 |
| | | | | 701/300 |
| 2010/0054538 | A1* | 3/2010 | Boon | G06T 7/246 |
| | | | | 382/104 |
| 2013/0063600 | A1* | 3/2013 | Pawlicki | G01S 11/12 |
| | | | | 348/148 |
| 2013/0177211 | A1* | 7/2013 | Watanabe | G06V 20/588 |
| | | | | 382/103 |
| 2018/0024568 | A1* | 1/2018 | Fridman | G06T 7/12 |
| | | | | 701/28 |
| 2018/0057001 | A1 | 3/2018 | Hu et al. | |
| 2018/0148092 | A1* | 5/2018 | Kataoka | B62D 15/025 |
| 2020/0125861 | A1* | 4/2020 | Sota | B62D 15/025 |
| 2020/0242372 | A1* | 7/2020 | Mandai | G01S 17/42 |
| 2021/0231457 | A1* | 7/2021 | Neyama | H04W 4/025 |
| 2021/0400190 | A1* | 12/2021 | Tanaka | G06T 7/74 |
| 2022/0108117 | A1* | 4/2022 | Potnis | G01S 17/89 |
| 2022/0198197 | A1* | 6/2022 | Wan | G06F 30/23 |
| 2022/0292847 | A1* | 9/2022 | Kibayashi | G08G 1/09626 |
| 2022/0307840 | A1* | 9/2022 | Nakatani | G01C 21/30 |
| 2022/0309805 | A1* | 9/2022 | Tanabe | G06V 10/751 |
| 2023/0021027 | A1* | 1/2023 | Chen | G06T 7/66 |
| 2023/0098314 | A1* | 3/2023 | Bacchus | B60W 50/06 |
| | | | | 701/25 |
| 2024/0029451 | A1* | 1/2024 | Li | G06V 20/56 |
| 2024/0098227 | A1* | 3/2024 | Yamamoto | H04N 7/18 |
| 2024/0375712 | A1* | 11/2024 | Prasad Challa | B62D 15/026 |
| 2025/0304166 | A1* | 10/2025 | Otagaki | B62D 15/0265 |

FOREIGN PATENT DOCUMENTS

| | | | |
|---|---|---|---|
| CN | 120654398 A | * | 9/2025 |
| JP | 2007-241470 A | | 9/2007 |
| JP | 2018083563 A | | 5/2018 |
| JP | 2019-144066 A | | 8/2019 |
| JP | 2022188532 A | * | 12/2022 |
| KR | 20170030816 A | * | 3/2017 |

* cited by examiner

APPARATUS, METHOD, AND COMPUTER PROGRAM FOR ESTIMATING ROAD EDGE

FIELD

The present invention relates to an apparatus, a method, and a computer program for estimating the position of a road edge from images representing the road edge.

BACKGROUND

To assist a driver in driving a vehicle, a technique has been proposed by which a road edge is obtained using scene image data captured by a vehicle-mounted camera and the travel direction of the vehicle is controlled so as to prevent the vehicle from crossing the road edge (see Japanese Unexamined Patent Publication JP2018-83563A). A driving assistance device disclosed in JP2018-83563A estimates a portion of a road edge that cannot be obtained, for a predetermined period, based on an immediately preceding road edge obtained immediately before the device becomes unable to obtain the road edge.

SUMMARY

A road edge does not always exist at a place that cannot be seen from a vehicle-mounted camera. Thus, it is desirable to appropriately estimate the position of a road edge at a place where the road edge is not represented in images generated by a vehicle-mounted camera.

It is an object of the present invention to provide an apparatus that can appropriately estimate the position of a road edge at a place that cannot be seen from a camera mounted on a vehicle.

According to an embodiment, an apparatus for estimating a road edge is provided. The apparatus includes a processor configured to: estimate a trajectory of a vehicle, based on a sensor signal obtained by a sensor for sensing motion of the vehicle mounted on the vehicle or the position of the vehicle determined by a position determining device mounted on the vehicle, estimate the position of an edge of a road traveled by the vehicle, based on an image representing the edge of the road. The image is one of images generated during travel of the vehicle by a camera mounted on the vehicle. The processor is further configured to: identify an undetected section traveled by the vehicle when an image, of the images, from which the edge of the road is not detected was generated, determine whether the road in the undetected section has a structure with an edge, based on the position of the vehicle at generation of the image in the undetected section, the image generated in the undetected section, or the motion of the vehicle in the trajectory corresponding to the undetected section, estimate the position of the edge of the road in the undetected section by interpolation based on the positions of the edge of the road in front of and behind the undetected section along the trajectory when the road in the undetected section has a structure with an edge, and omit to estimate the position of the edge of the road in the undetected section when the road in the undetected section has a structure without an edge.

The processor of the apparatus preferably detects another vehicle in the direction from the vehicle toward the edge of the road in front of or behind the undetected section from the image generated in the undetected section, estimates the distance from the vehicle to the detected vehicle, and determines that the road in the undetected section has a structure without an edge, when the estimated distance to the detected vehicle is greater than the distance from the vehicle to the edge of the road in front of or behind the undetected section.

The apparatus preferably further includes a memory configured to store map information representing the structure of the road in the undetected section. The processor preferably determines that the road in the undetected section has a structure without an edge, when in the map information a space that the vehicle is allowed to enter is represented outside the road traveled by the vehicle in the undetected section.

Alternatively, the processor of the apparatus preferably determines that the road in the undetected section has a structure without an edge, when the trajectory indicates that the vehicle stopped for a predetermined period or more in the undetected section or the immediately preceding section of the undetected section with an ignition switch kept ON.

Alternatively, the processor of the apparatus preferably determines that the road in the undetected section has a structure without an edge, when the travel direction of the vehicle in the undetected section differs from the travel direction of the vehicle in the immediately preceding section of the undetected section by a predetermined angle or more.

Alternatively, the processor of the apparatus preferably determines that the road in the undetected section has a structure without an edge, when the position of the vehicle in the undetected section indicated by the trajectory is farther from the road than a line connecting the positions of the edge of the road in the sections in front of and behind the undetected section.

Alternatively, the processor of the apparatus preferably determines that the road in the undetected section has a structure without an edge, when a traffic light, a stop line, or a crosswalk is detected from the image generated in the undetected section.

According to another embodiment, a method for estimating a road edge is provided. The method includes estimating a trajectory of a vehicle, based on a sensor signal obtained by a sensor for sensing motion of the vehicle mounted on the vehicle or the position of the vehicle determined by a position determining device mounted on the vehicle; and estimating the position of an edge of a road traveled by the vehicle, based on an image representing the edge of the road. The image is one of images generated during travel of the vehicle by a camera mounted on the vehicle. The method further includes identifying an undetected section traveled by the vehicle when an image, of the images, from which the edge of the road is not detected was generated; and determining whether the road in the undetected section has a structure with an edge, based on the position of the vehicle at generation of the image in the undetected section, the image generated in the undetected section, or the motion of the vehicle in the trajectory corresponding to the undetected section. The method further includes estimating the position of the edge of the road in the undetected section by interpolation based on the positions of the edge of the road in front of and behind the undetected section along the trajectory when the road in the undetected section has a structure with an edge; and omitting to estimate the position of the edge of the road in the undetected section when the road in the undetected section has a structure without an edge.

According to still another embodiment, a non-transitory recording medium that stores a computer program for estimating a road edge is provided. The computer program includes instructions causing a computer to execute a process including: estimating a trajectory of a vehicle, based on a sensor signal obtained by a sensor for sensing motion of the vehicle mounted on the vehicle or the position of the vehicle determined by a position determining device mounted on the vehicle; and estimating the position of an edge of a road traveled by the vehicle, based on an image representing the edge of the road. The image is one of images generated during travel of the vehicle by a camera mounted on the vehicle. The process further includes identifying an undetected section traveled by the vehicle when an image, of the images, from which the edge of the road is not detected was generated; and determining whether the road in the undetected section has a structure with an edge, based on the position of the vehicle at generation of the image in the undetected section, the image generated in the undetected section, or the motion of the vehicle in the trajectory corresponding to the undetected section. The process further includes estimating the position of the edge of the road in the undetected section by interpolation based on the positions of the edge of the road in front of and behind the undetected section along the trajectory when the road in the undetected section has a structure with an edge; and omitting to estimate the position of the edge of the road in the undetected section when the road in the undetected section has a structure without an edge.

The apparatus according to the present disclosure has an advantageous effect of being able to appropriately estimate the position of a road edge at a place that cannot be seen from a camera mounted on a vehicle.

DESCRIPTION OF EMBODIMENTS

An apparatus for estimating a road edge, a method therefor executed by the apparatus, and a computer program therefor will now be described with reference to the attached drawings. The apparatus estimates a trajectory of a vehicle in a predetermined road section traveled by the vehicle, and detects a road edge in the road section from a series of images representing the surroundings of the vehicle and generated by a camera mounted on the vehicle, thereby estimating the position of the road edge. To this end, the apparatus identifies a section traveled by the vehicle at generation of an image from which no road edge is detected as an undetected section. The apparatus then determines whether the road in the undetected section has a structure with an edge, based on the image from which no road edge is detected, the position of the vehicle at generation of the image, or the motion of the vehicle in the identified undetected section. When it is determined that the road in the undetected section has a structure with an edge, the apparatus estimates the position of the road edge in the undetected section by interpolation based on the positions of the road edge in front of and behind the undetected section along the trajectory of the vehicle. When it is determined that the road in the undetected section has a structure without an edge, the apparatus omits to estimate the position of the road edge in the undetected section and determines that the edge does not exist.

The following describes an example in which the apparatus for estimating a road edge is applied to a feature data collecting system that collects feature data obtained during travel of a vehicle and representing road edges, various road markings, traffic lights, and other features related to travel of vehicles. The collected feature data is used to generate or update map information including information on features related to travel of vehicles. However, the apparatus may be used for a system other than a feature data collecting system. For example, the apparatus may be applied to a vehicle control system that assists in travel of a vehicle or executes autonomous driving control of a vehicle.

Figure 1:
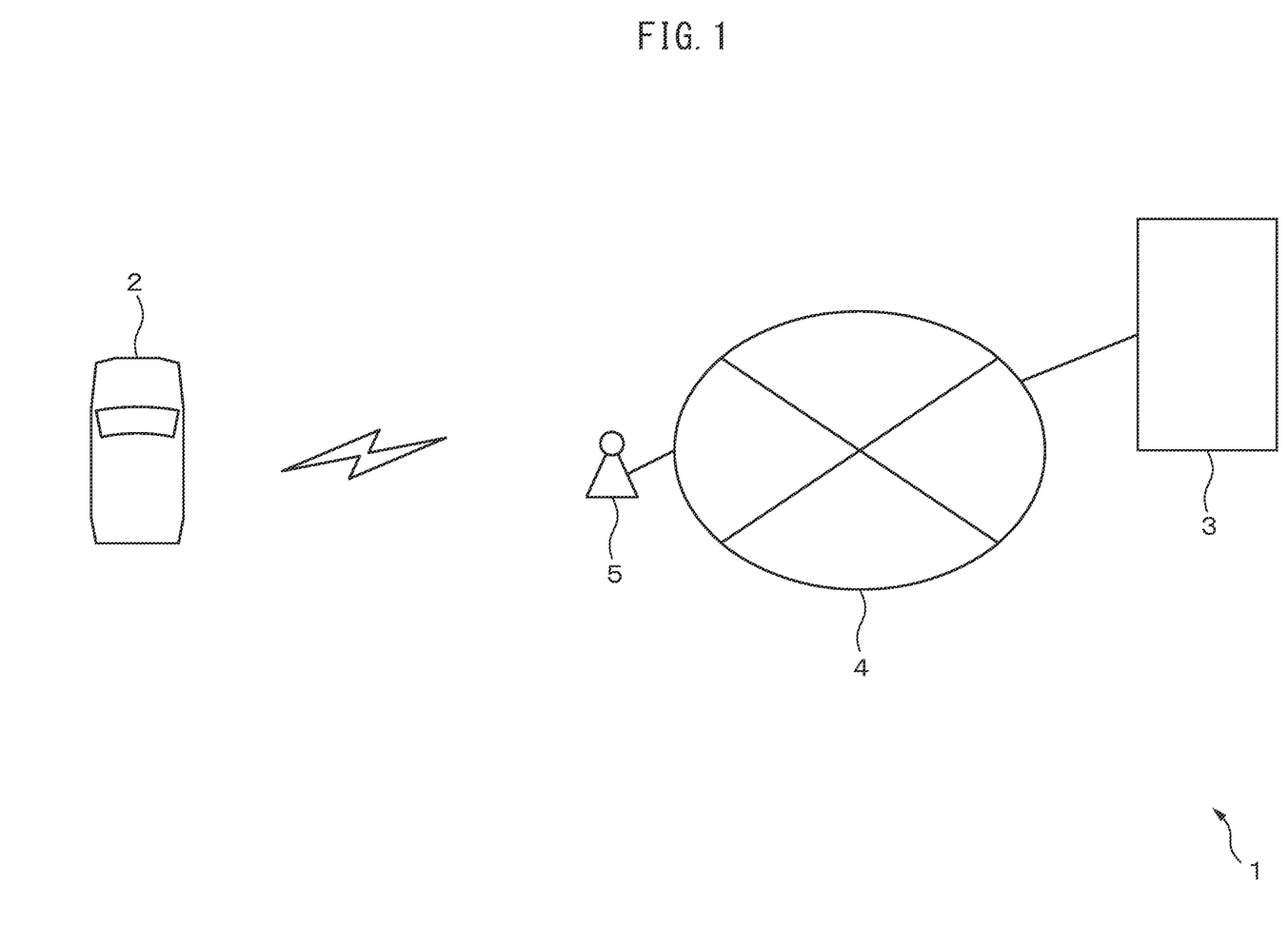
FIG. 1 schematically illustrates the configuration of a feature data collecting system including an apparatus for estimating a road edge.

FIG. 1 schematically illustrates the configuration of a feature data collecting system equipped with the apparatus for estimating a road edge. In the present embodiment, the feature data collecting system 1 includes at least one vehicle 2 and a server 3, which is an example of the apparatus for estimating a road edge. Each vehicle 2 accesses a wireless base station 5, which is connected, for example, via a gateway (not illustrated) to a communication network 4 connected with the server 3, thereby connecting to the server 3 via the wireless base station 5 and the communication network 4. For simplicity, FIG. 1 illustrates only a single vehicle 2, but the system 1 may include multiple vehicles 2. FIG. 1 also illustrates only a single wireless base station 5, but the communication network 4 may be connected with multiple wireless base stations 5.

Figure 2:
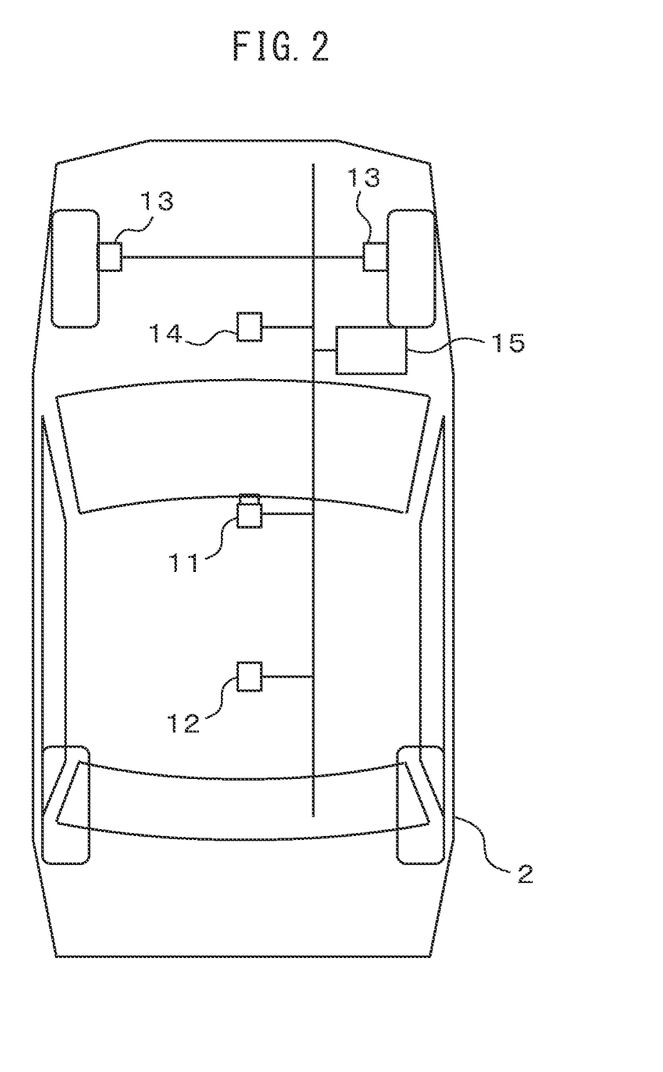
FIG. 2 schematically illustrates the configuration of a vehicle.

FIG. 2 schematically illustrates the configuration of the vehicle 2. The vehicle 2 includes a camera 11, a GPS receiver 12, at least one vehicle motion sensor 13, a wireless communication terminal 14, and a data acquisition device 15, which are communicably connected via an in-vehicle network conforming to a standard such as a controller area network. The vehicle motion sensor 13 may be connected to an electronic control unit (ECU, not illustrated) that controls travel of the vehicle 2. The vehicle 2 may further include a navigation device (not illustrated) that searches for a planned travel route of the vehicle 2 and that navigates so that the vehicle 2 travels along the planned travel route.

The camera 11, which is an example of an image capturing unit for capturing the surroundings of the vehicle 2, includes a two-dimensional detector constructed from an array of optoelectronic transducers, such as CCD or C-MOS, having sensitivity to visible light and a focusing optical system that forms an image of a predetermined target region of capturing on the two-dimensional detector. The camera 11 is mounted, for example, in the interior of the vehicle 2 so as to be oriented, for example, to the front, the rear, or the side of the vehicle 2. The camera 11 takes a picture of a predetermined region around the vehicle 2 every predetermined capturing period (e.g., 1/30 to 1/10 seconds), and generates images representing the predetermined region. The images obtained by the camera 11 may be color or grayscale images. The vehicle 2 may include multiple cameras 11 taking pictures in different orientations or having different focal lengths.

Whenever an image is generated, the camera 11 outputs the generated image to the data acquisition device 15 via the in-vehicle network.

The GPS receiver 12, which is an example of the position determining device, receives GPS signals from GPS satellites at predetermined intervals, and determines the position of the vehicle 2, based on the received GPS signals. The GPS receiver 12 outputs positioning information indicating the result of determination of the position of the vehicle 2 based on the GPS signals to the data acquisition device 15 via the in-vehicle network at predetermined intervals. The vehicle 2 may include a receiver conforming to a satellite positioning system other than the GPS receiver 12. In this case, this receiver determines the position of the vehicle 2.

The vehicle motion sensor 13, which is an example of a sensor for sensing motion of the vehicle 2, obtains information on motion of the vehicle 2 (hereafter "vehicle motion information"), and generates a sensor signal indicating the vehicle motion information. The vehicle motion information represents, for example, the wheel speed, the angular velocities of the vehicle 2 around three mutually perpendicular axes, or the acceleration of the vehicle 2. The vehicle motion sensor 13 includes, for example, at least one of the following: a wheel speed sensor for measuring the wheel speed of the vehicle 2, a gyro sensor for measuring the angular velocities of the vehicle 2 around three mutually perpendicular axes, and an acceleration sensor for measuring the acceleration of the vehicle 2. The vehicle motion sensor 13 generates sensor signals at predetermined intervals, and outputs the generated sensor signals to the data acquisition device 15 via the in-vehicle network. In the case where the vehicle motion sensor 13 is connected to the ECU, the sensor signals generated by the vehicle motion sensor 13 are outputted to the data acquisition device 15 via the ECU and the in-vehicle network.

The wireless communication terminal 14, which is an example of a communication unit, is a device to execute a wireless communication process conforming to a predetermined standard of wireless communication, and accesses, for example, the wireless base station 5 to connect to the server 3 via the wireless base station 5 and the communication network 4. The wireless communication terminal 14 generates an uplink radio signal including feature data and travel information received from the data acquisition device 15, and transmits the uplink radio signal to the wireless base station 5 to transmit the feature data and the travel information to the server 3. In addition, the wireless communication terminal 14 receives a downlink radio signal from the wireless base station 5, and passes, for example, a collection instruction from the server 3 included in the radio signal to the data acquisition device 15 or the ECU.

Figure 3:
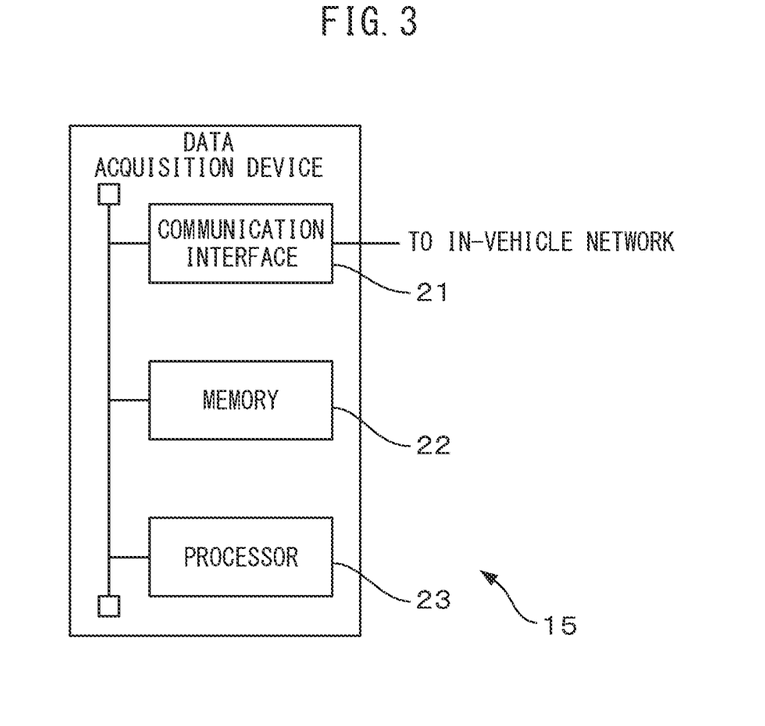
FIG. 3 illustrates the hardware configuration of a data acquisition device.

FIG. 3 illustrates the hardware configuration of the data acquisition device 15. The data acquisition device 15 generates feature data, based on an image generated by the camera 11, and further generates travel information indicating traveling motion of the vehicle 2. To achieve this, the data acquisition device 15 includes a communication interface 21, a memory 22, and a processor 23.

The communication interface 21, which is an example of an in-vehicle communication unit, includes an interface circuit for connecting the data acquisition device 15 to the in-vehicle network. In other words, the communication interface 21 is connected to the camera 11, the GPS receiver 12, the vehicle motion sensor 13, and the wireless communication terminal 14 via the in-vehicle network. Whenever an image is received from the camera 11, the communication interface 21 passes the received image to the processor 23. Whenever positioning information is received from the GPS receiver 12, the communication interface 21 passes the received positioning information to the processor 23. Whenever a sensor signal is received from the vehicle motion sensor 13 or the ECU, the communication interface 21 passes the received sensor signal to the processor 23. Further, the communication interface 21 passes an instruction to collect feature data received from the server 3 via the wireless communication terminal 14 to the processor 23. Further, the communication interface 21 outputs feature data and travel information received from the processor 23 to the wireless communication terminal 14 via the in-vehicle network.

The memory 22 includes, for example, volatile and nonvolatile semiconductor memories. The memory 22 may further include other storage, such as a hard disk drive. The memory 22 stores various types of data used in a process related to generation of feature data and travel information executed by the processor 23 of the data acquisition device 15. Such data includes, for example, identifying information of the vehicle 2 and parameters of the camera 11, such as the height of the mounted position, the imaging direction, and the angle of view of the camera 11. The memory 22 may also store images received from the camera 11, positioning information received from the GPS receiver 12, and vehicle motion information included in sensor signals generated by the vehicle motion sensor 13 for a certain period. In addition, the memory 22 stores information indicating a target region for generating and collecting feature data (hereafter a "collection target region") specified in an instruction to collect feature data. The memory 22 may further store computer programs for various processes executed by the processor 23.

The processor 23 includes one or more central processing units (CPUs) and a peripheral circuit thereof. The processor 23 may further include another operating circuit, such as a logic-arithmetic unit, an arithmetic unit, or a graphics processing unit. The processor 23 stores images received from the camera 11, positioning information received from the GPS receiver 12, and vehicle motion information included in sensor signals received from the vehicle motion sensor 13 or the ECU in the memory 22. In addition, the processor 23 executes the process related to generation of feature data and travel information at predetermined intervals (e.g., 0.1 to 10 seconds) during travel of the vehicle 2.

As the process related to generation of feature data, for example, the processor 23 determines whether the position of the vehicle 2 indicated by positioning information received from the GPS receiver 12 is within a collection target region. When the position of the vehicle is within a collection target region, the processor 23 generates feature data, based on an image received from the camera 11.

Feature data represents features related to travel of vehicles. In the present embodiment, the processor 23 includes an image generated by the camera 11, the time of generation of the image, the travel direction of the vehicle 2 at the time of generation, and parameters of the camera 11, such as the height of the mounted position, the imaging direction, and the angle of view of the camera 11, in feature data. The processor 23 obtains information indicating the travel direction of the vehicle 2 from the ECU of the vehicle 2. Whenever feature data is generated, the processor 23 transmits the generated feature data to the server 3 via the wireless communication terminal 14. The processor 23 may include multiple images, the times of generation of the respective images, and the travel directions of the vehicle 2 in a single piece of feature data. The processor 23 may transmit the parameters of the camera 11 to the server 3 via the wireless communication terminal 14 separately from feature data.

The processor 23 further generates travel information of the vehicle 2 after predetermined timing (e.g., timing at which an ignition switch of the vehicle 2 is turned on), and transmits the travel information to the server 3 via the wireless communication terminal 14. The processor 23 includes a series of pieces of positioning information obtained at certain intervals after the predetermined timing, the times of determination of the position of the vehicle 2 in the respective pieces of positioning information, and pieces of vehicle motion information, such as wheel speeds, accelerations, and angular velocities, in the travel information. The processor 23 may further include information indicating the timing of turning on or off the ignition switch obtained from the ECU, in the travel information. The processor 23 may further include identifying information of the vehicle 2 in the travel information and the feature data.

Figure 4:
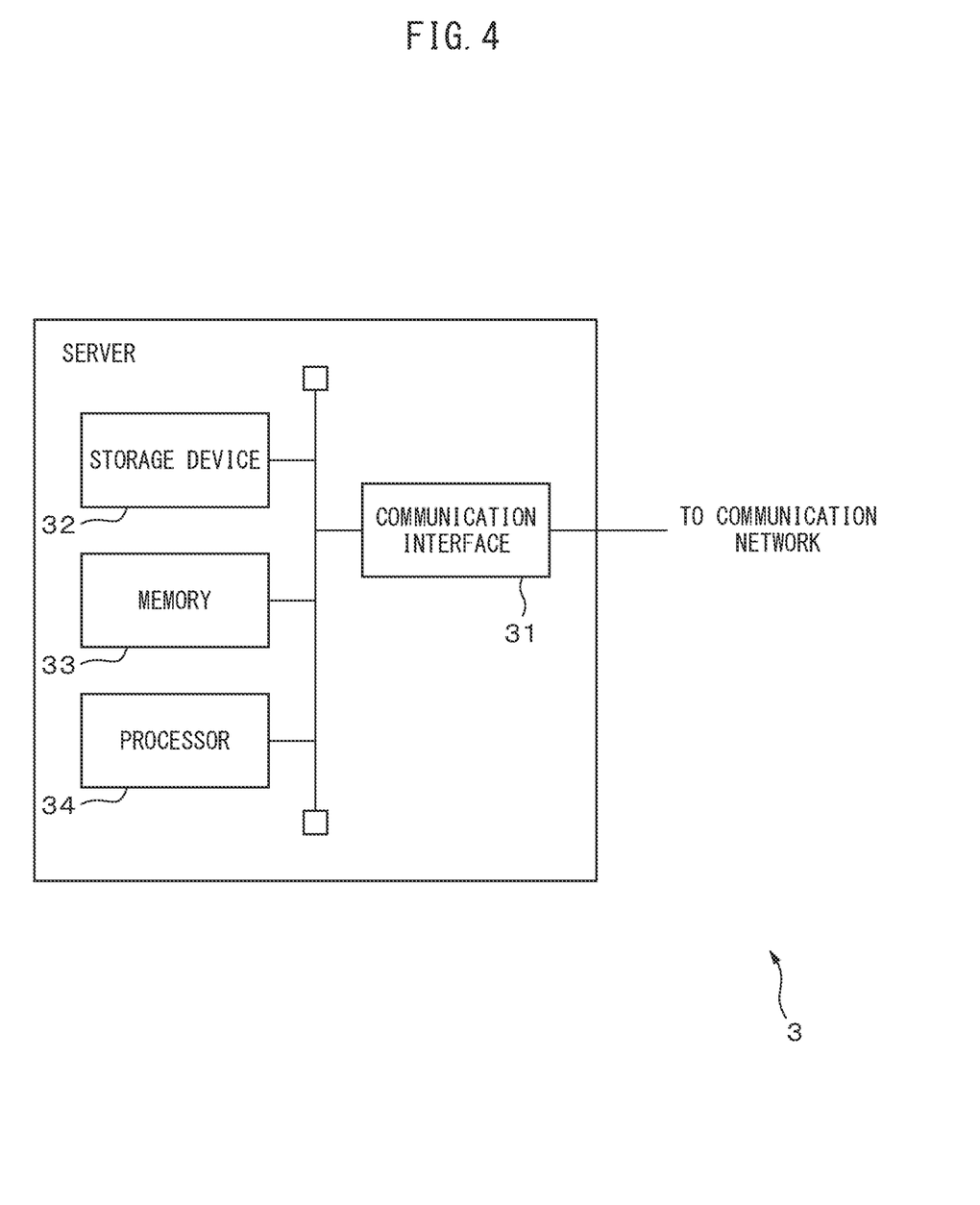
FIG. 4 illustrates the hardware configuration of a server, which is an example of the apparatus for estimating a road edge.

The following describes the server 3, which is an example of the apparatus for estimating a road edge. FIG. 4 illustrates the hardware configuration of the server 3, which is an example of the apparatus for estimating a road edge. The server 3 includes a communication interface 31, a storage device 32, a memory 33, and a processor 34. The communication interface 31, the storage device 32, and the memory 33 are connected to the processor 34 via a signal line. The server 3 may further include an input device, such as a keyboard and a mouse, and a display device, such as a liquid crystal display.

The communication interface 31, which is an example of a communication unit, includes an interface circuit for connecting the server 3 to the communication network 4. The communication interface 31 is configured to be communicable with the vehicle 2 via the communication network 4 and the wireless base station 5. More specifically, the communication interface 31 passes to the processor 34 feature data and travel information received from the vehicle 2 via the wireless base station 5 and the communication network 4. In addition, the communication interface 31 transmits a collection instruction received from the processor 34 to the vehicle 2 via the communication network 4 and the wireless base station 5.

The storage device 32, which is an example of the storage unit, includes, for example, a hard disk drive, or an optical medium and an access device therefor, and stores various types of data and information used in a road edge estimation process. For example, the storage device 32 stores a set of parameters for defining a classifier for detecting a road edge and a feature from an image. The storage device 32 may also store a map for navigation used by the navigation device for searching for a travel route. The storage device 32 further stores feature data and travel information received from each vehicle 2. The storage device 32 may further store a computer program for the road edge estimation process executed by the processor 34.

The memory 33, which is another example of the storage unit, includes, for example, nonvolatile and volatile semiconductor memories. The memory 33 temporarily stores various types of data generated during execution of the road edge estimation process.

The processor 34, which is an example of a control unit, includes one or more central processing units (CPUs) and a peripheral circuit thereof. The processor 34 may further include another operating circuit, such as a logic-arithmetic unit or an arithmetic unit. The processor 34 executes a map update process including the road edge estimation process.

Figure 5:
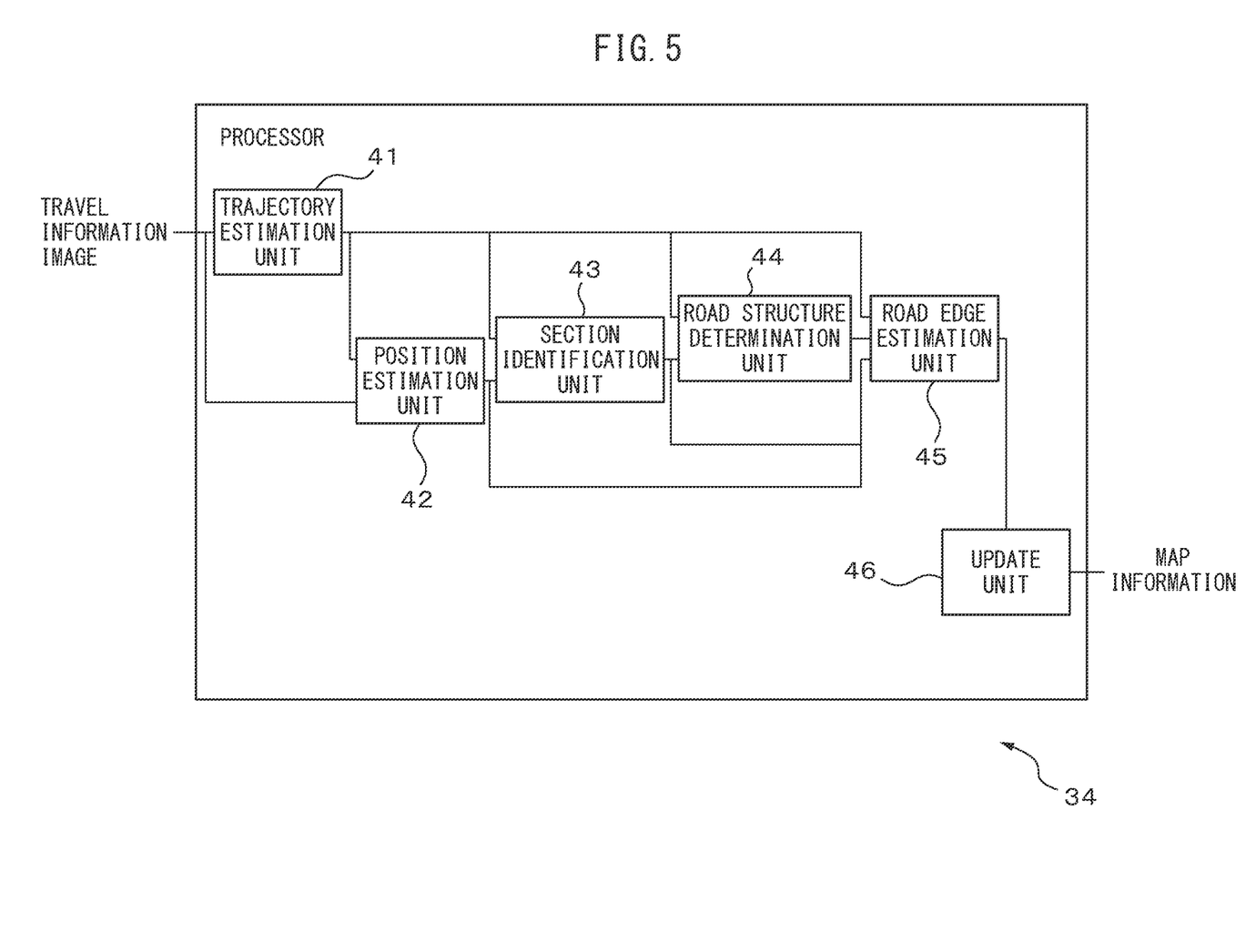
FIG. 5 is a functional block diagram of a processor of the server, related to a map update process including a road edge estimation process.

FIG. 5 is a functional block diagram of the processor 34, related to the map update process including the road edge estimation process. The processor 34 includes a trajectory estimation unit 41, a position estimation unit 42, a section identification unit 43, a road structure determination unit 44, a road edge estimation unit 45, and a map update unit 46. These units included in the processor 34 are functional modules, for example, implemented by a computer program executed by the processor 34, or may be dedicated operating circuits provided in the processor 34. Of these units included in the processor 34, the processing of the units except the map update unit 46 relates to the road edge estimation process.

The trajectory estimation unit 41 estimates the trajectory of the vehicle 2 that traveled through a predetermined section, based on travel information of the vehicle 2 in the predetermined section. In the following, the trajectory of the vehicle 2 may be referred to simply as the trajectory.

For example, the trajectory estimation unit 41 can estimate the trajectory by arranging the positions of the vehicle 2 indicated by a series of pieces of positioning information included in the travel information of the vehicle 2 in chronological order of determination of the position of the vehicle 2. The trajectory estimation unit 41 may further include measurement times of the individual positions of the vehicle 2 in the estimated trajectory. When the received travel information includes the timing of turning on or off the ignition switch, the trajectory estimation unit 41 may further include information for identifying the position of the vehicle 2 at the timing of turning on or off the ignition switch, in the trajectory.

Alternatively, the trajectory estimation unit 41 may estimate the trajectory of the vehicle 2 in accordance with the technique of "structure from motion (SfM)." In this case, the trajectory estimation unit 41 detects one or more features in an area around the vehicle 2 from each of a series of images that are included in feature data received from the vehicle 2 and that are generated by the camera 11 of the vehicle 2 traveling through the predetermined section.

For example, the trajectory estimation unit 41 inputs each of the series of images into a classifier that has been trained to detect a detection target feature, thereby detecting a feature represented in the inputted image (hereafter simply the "input image"). As such a classifier, the trajectory estimation unit 41 can use, for example, a deep neural network (DNN) that has been trained to detect a feature represented in an image from the input image. As such a DNN, for example, a DNN having architecture of a convolutional neural network (CNN) type, e.g., Single Shot MultiBox Detector (SSD) or Faster R-CNN, is used. Alternatively, as such a DNN, a DNN having architecture of a self-attention network type, e.g., a Vision Transformer, may be used. In this case, for each type of detection target feature (e.g., a traffic light, a lane-dividing line, a pedestrian crossing, and a stop line), the classifier calculates a confidence score indicating how likely the feature is represented in a region in the input image; the classifier calculates the confidence score for each of various regions in the input image. The classifier determines that the region where the confidence score of a certain type of feature is not less than a predetermined detection threshold represents the type of feature. The classifier then outputs information indicating a region including a detection target feature in the input image, e.g., a circumscribed rectangle of the detection target feature (hereafter an "object region") and information indicating the type of the feature represented in the object region.

In accordance with the technique of SfM, the trajectory estimation unit 41 estimates the positions of the vehicle 2 at generation of the respective images and the positions of a detected individual feature relative to these positions. The trajectory estimation unit 41 then estimates the trajectory, based on the result of the estimation.

The positions of pixels in an image correspond one-to-one to the directions from the camera 11 to objects represented in the respective pixels. Thus the trajectory estimation unit 41 can estimate the positional relationship between the vehicle 2 and a feature in each image, based on the direction from the camera 11 corresponding to a characteristic point representing the feature in the image, the distance traveled by the vehicle 2 between the times of generation of images, the travel direction of the vehicle 2, and the parameters of the camera 11.

The trajectory estimation unit 41 can use the position of the vehicle 2 indicated by that positioning information obtained by the GPS receiver 12 at the predetermined timing which is included in the travel information as the initial position of the trajectory of the vehicle 2. Thereafter, the trajectory estimation unit 41 estimates the distance traveled by the vehicle 2 between the times of generation of images, using vehicle motion information, such as the wheel speed, the acceleration, and the angular velocity, included in the travel information.

The trajectory estimation unit 41 associates the same features detected in respective images obtained at different timings during travel of the vehicle 2 with each other. For example, the trajectory estimation unit 41 can associate characteristic points included in object regions representing the same features of interest in multiple images with each other, using a tracking technique using optical flow. The trajectory estimation unit 41 can estimate the positions of the vehicle 2 at generation of the respective images and the positions of the feature of interest relative to the positions of the vehicle 2 at generation of the respective images, by triangulation. To this end, the trajectory estimation unit 41 uses the travel directions of the vehicle 2 at generation of the respective images, the position of the vehicle 2 at generation of one of the images, the distances traveled by the vehicle 2 between the times of generation of the images, the parameters of the camera 11, and the positions of the corresponding characteristic points in the respective images, for the triangulation.

The trajectory estimation unit 41 can sequentially estimate the positions of the vehicle 2 at generation of the respective images and the positions of each of the features around the vehicle 2 relative to these positions, by repeating the above-described process for each of the detected features. The trajectory estimation unit 41 can then estimate the trajectory by arranging the estimated positions of the vehicle 2 in order. In this case also, the trajectory estimation unit 41 may include the times of generation of images corresponding to the individual positions of the vehicle 2, in the estimated trajectory, as the times at which the vehicle 2 passed the respective positions.

The trajectory estimation unit 41 notifies information indicating the estimated trajectory to the position estimation unit 42, the section identification unit 43, the road structure determination unit 44, and the road edge estimation unit 45.

The position estimation unit 42 detects a road edge in the predetermined section from each of a series of images generated by the camera 11 during travel of the vehicle 2 through the predetermined section, and estimates the real-space position of the detected road edge. The following describes a process on a single image because the position estimation unit 42 executes the same process on each image.

The position estimation unit 42 inputs an image into a classifier that has been trained to detect a road edge, thereby detecting a road edge represented in the inputted image. As such a classifier, the position estimation unit 42 can use a classifier similar to the classifier for feature detection described in relation to the trajectory estimation unit 41. Alternatively, as such a classifier, the position estimation unit 42 may use a DNN for semantic segmentation that identifies objects represented in respective pixels, such as a fully convolutional network or U-net. In this case, the classifier is trained in advance to classify the pixels of the image as pixels representing the outside of the road and pixels representing the road. The position estimation unit 42 then determines that the road edge is represented by the pixels on the outer edge of the set of pixels representing the road outputted by the classifier.

For each pixel representing the road edge, the position estimation unit 42 estimates the real-space position of the road edge represented in the pixel, based on the position of the pixel in the image, the position and the travel direction of the vehicle 2 at generation of the image, and the parameters of the camera 11. The position estimation unit 42 obtains the position and the travel direction of the vehicle 2 at generation of the image from the trajectory estimation unit 41.

For each pixel representing the road edge, as described above, or for only some of the pixels representing the road edge, the position estimation unit 42 may estimate the position of the road edge represented in the pixel. The position estimation unit 42 may estimate the position of only one of the edges of the road being traveled by the vehicle 2. For example, the position estimation unit 42 may estimate the position of a road edge on the side where the vehicle 2 is allowed to travel in the predetermined section. More specifically, when the road in the predetermined section is a road where the vehicle 2 keeps to the left, the position estimation unit 42 estimates the position of the left road edge. In this case, the position estimation unit 42 uses those pixels in the set of pixels representing road edges which adjoin pixels of the road surface on the side closer to the vehicle 2, for estimating the position of the road edge. Alternatively, the position estimation unit 42 uses those pixels in the set of pixels representing road edges which lie on the left of the pixel line corresponding to the travel direction of the vehicle 2 in the image identified from the mounted position and the imaging direction of the camera 11, for estimating the position of the road edge.

For each image from which a road edge is detected, the position estimation unit 42 notifies the road edge estimation unit 45 and the map update unit 46 of the estimated position of the road edge represented in the image. The position estimation unit 42 also notifies the section identification unit 43 of the time of generation of each image from which no road edge is detected.

The section identification unit 43 identifies a section traveled by the vehicle 2 at generation of an image from which no road edge is detected, as an undetected section; the image is one of a series of images generated by the camera 11 during travel of the vehicle 2 through the predetermined section. To achieve this, the section identification unit 43 identifies the position of the vehicle 2 at generation of each image from which no road edge is detected, by referring to the time of generation, which is notified by the position estimation unit 42, and the travel information. The section identification unit 43 then determines the section including the set of the identified positions of the vehicle 2 in the trajectory estimated by the trajectory estimation unit 41 as an undetected section.

The section identification unit 43 notifies information indicating the undetected section to the road structure determination unit 44 and the road edge estimation unit 45.

The road structure determination unit 44 determines whether the road traveled by the vehicle 2 in the undetected section has a structure with an edge. A structure with a road edge refers to a structure of a road such that a road surface portion where vehicles are allowed to travel is separated from a portion where vehicles are not allowed to travel and has a boundary. Conversely, a structure without a road edge refers to a structure including a space through which vehicles are allowed to enter the outside of the road in the direction crossing the lengthwise direction of the road, such as an intersection, a railroad crossing, or a gateway to private land, e.g., a parking lot. Examples of a structure without a road edge may further include a structure including a lane that only a particular type of vehicle is allowed to enter, such as a bus lane, closer to a road edge than a lane where ordinary vehicles are allowed to travel. Thus, in a section of a road having a structure without an edge, there may be an object farther in the direction toward the outside of the road than in the next and previous sections. Alternatively, in such a section, the vehicle 2 may move farther in the direction toward the outside of the road than the road edge in the next and previous sections. Additionally, in a section of a road having a structure without an edge, a space that the vehicle 2 is allowed to enter, such as an intersection or a railroad crossing, may be represented outside the road traveled by the vehicle 2 in the map for navigation. Thus the road structure determination unit 44 uses the position of the undetected section, an object represented in an image generated by the camera 11 in the undetected section, or the motion of the vehicle 2 during travel through the undetected section, for determining the presence or absence of a road edge. In the following, the road traveled by the vehicle 2 in the undetected section may be referred to simply as the road in the undetected section.

For example, the road structure determination unit 44 refers to the position of the undetected section and the map for navigation. When a space through which the vehicle 2 is allowed to enter the outside of the road, such as an intersection, is represented in the undetected section in the map for navigation, the road structure determination unit 44 determines that the road in the undetected section has a structure without an edge.

Further, when the trajectory of the vehicle 2 indicates that the position of the vehicle 2 in the undetected section is farther from the road than a line connecting the positions of the edge of the road in the next and previous sections, the road structure determination unit 44 determines that the road in the undetected section has a structure without an edge. Alternatively, the road structure determination unit 44 may determine the structure of the road in the undetected section, based on a change in the travel direction of the vehicle 2 in front of and behind the undetected section, by referring to the trajectory of the vehicle 2. For example, when the travel direction of the vehicle 2 in the immediately preceding section of the undetected section differs from that of the vehicle 2 in the undetected section by a predetermined angle or more (e.g., 45 degrees or more), the vehicle 2 probably made a right or left turn at an intersection, or turned aside from the road being traveled. Thus, in such a case, the road structure determination unit 44 determines that the road in the undetected section has a structure without an edge. Further, when the undetected section includes an intersection, the vehicle 2 may stop immediately before the intersection. Thus, when the trajectory indicates that the vehicle 2 stopped for a predetermined period or more in the undetected section or the immediately preceding section with the ignition switch kept ON, the road structure determination unit 44 may determine that the road in the undetected section has a structure without an edge. The road structure determination unit 44 determines that the vehicle 2 stopped at a position included in the trajectory of the vehicle 2 for a predetermined period, when multiple measurement times ranging over the predetermined period are associated with the position. Further, when the undetected section includes an intersection, there may be a traffic light, a stop line, or a crosswalk in the undetected section or the next or previous section. Thus, when a traffic light, a stop line, or a crosswalk is detected from an image generated by the camera 11 during travel of the vehicle 2 through the undetected section, the road structure determination unit 44 may determine that the road in the undetected section has a structure without an edge. In this case, the road structure determination unit 44 inputs the image into a classifier to detect a traffic light, a stop line, or a crosswalk. As such a classifier, the road structure determination unit 44 can use a classifier similar to the classifier for feature detection described in relation to the trajectory estimation unit 41. Alternatively, the classifier used by the trajectory estimation unit 41 or the position estimation unit 42 may be trained in advance to detect a traffic light, a stop line, or a crosswalk, too.

Further, the road structure determination unit 44 may determine the structure of the road in the undetected section by comparing the position of another vehicle detected from an image generated by the camera 11 during travel of the vehicle 2 through the undetected section with the positions of a road edge in the next and previous sections. In this case, the road structure determination unit 44 inputs the image into a classifier to detect another vehicle. As such a classifier, the road structure determination unit 44 can use a classifier similar to that described above. Alternatively, the above-described classifier or the classifier used by the trajectory estimation unit 41 or the position estimation unit 42 may be trained in advance to detect another vehicle, too. The bottom position of a region representing another vehicle in the image is assumed to correspond to the position at which the vehicle is in contact with the road surface. The pixels in the image correspond one-to-one to the directions viewed from the camera 11. Thus the road structure determination unit 44 can estimate the direction and the distance from the vehicle 2 to the detected vehicle, based on the bottom position of the region representing the vehicle in the image, the position and the travel direction of the vehicle 2, and parameters such as the height of the mounted position and the imaging direction of the camera 11. Based on the direction and distance, the road structure determination unit 44 can estimate the distance from the vehicle 2 to the detected vehicle in the direction perpendicular to the lengthwise direction of the road traveled by the vehicle 2 (hereafter referred to as the "lateral distance" for convenience of description). The road structure determination unit 44 then compares the lateral distance from the vehicle 2 to the detected vehicle with the lateral distances from the vehicle 2 to the road edge in the sections in front of and behind the undetected section. When the lateral distance from the vehicle 2 to the detected vehicle is greater than the lateral distance from the vehicle 2 to the road edge in the section in front of or behind the undetected section, the road structure determination unit 44 determines that the road in the undetected section has a structure without an edge.

When none of the above-described criteria for determining that the road has a structure without an edge is satisfied, the road structure determination unit 44 can determine that the road traveled by the vehicle 2 in the undetected section has a structure with an edge. For example, when the lateral distance from the vehicle 2 to the detected vehicle is less than the lateral distance from the vehicle 2 to the road edge in the section in front of or behind the undetected section, the detected vehicle is assumed to be parked near the road edge and thus covers the road edge. Thus, in such a case, the road structure determination unit 44 determines that the road traveled by the vehicle 2 in the undetected section has a structure with an edge. Further, the road structure determination unit 44 may refer to the trajectory of the vehicle 2, and determine that the road traveled by the vehicle 2 in the undetected section has a structure with an edge, when the trajectory indicates that the vehicle 2 stopped near such a parked vehicle. The road structure determination unit 44 determines that the vehicle 2 stopped near a parked vehicle, in the case where the vehicle 2 is stopped within a certain distance of the undetected section, the ignition switch is turned off, and the angular difference between the travel direction of the vehicle 2 and the lengthwise direction of the road is not greater than a predetermined angle. When the trajectory of the vehicle 2 indicates motion of the vehicle 2 inconsistent with the result of determination of the presence or absence of a road edge in the undetected section, the road structure determination unit 44 may determine the presence or absence of a road edge in the undetected section, based on the determining conditions in which the trajectory is not referred to.

The road structure determination unit 44 notifies the road edge estimation unit 45 of the result of determination of the structure of the road in the undetected section.

The road edge estimation unit 45 estimates the position of the edge of the road in the undetected section by interpolation based on the positions of the edge of the road in the sections in front of and behind the undetected section along the trajectory when the road in the undetected section has a structure with an edge. To this end, the road edge estimation unit 45 estimates the position of the road edge in the undetected section by interpolation such that the positions of the road edge in the next and previous sections are connected with a predetermined curve or a straight line. As the predetermined curve for the interpolation, the road edge estimation unit 45 can use, for example, a clothoid curve or a spline curve. In particular, a curved undetected section may be designed along a clothoid curve. Thus the road edge estimation unit 45 can estimate the position of the road edge in the undetected section accurately, using a clothoid curve as the predetermined curve for the interpolation. The road edge estimation unit 45 may set a flag indicating estimation by interpolation to the position of the road edge estimated by interpolation.

When the road in the undetected section has a structure without an edge, the road edge estimation unit 45 omits to estimate the position of the edge of the road in the undetected section. This enables the road edge estimation unit 45 to prevent erroneous estimation of the position of a road edge in a section without a road edge.

Figure 6A:
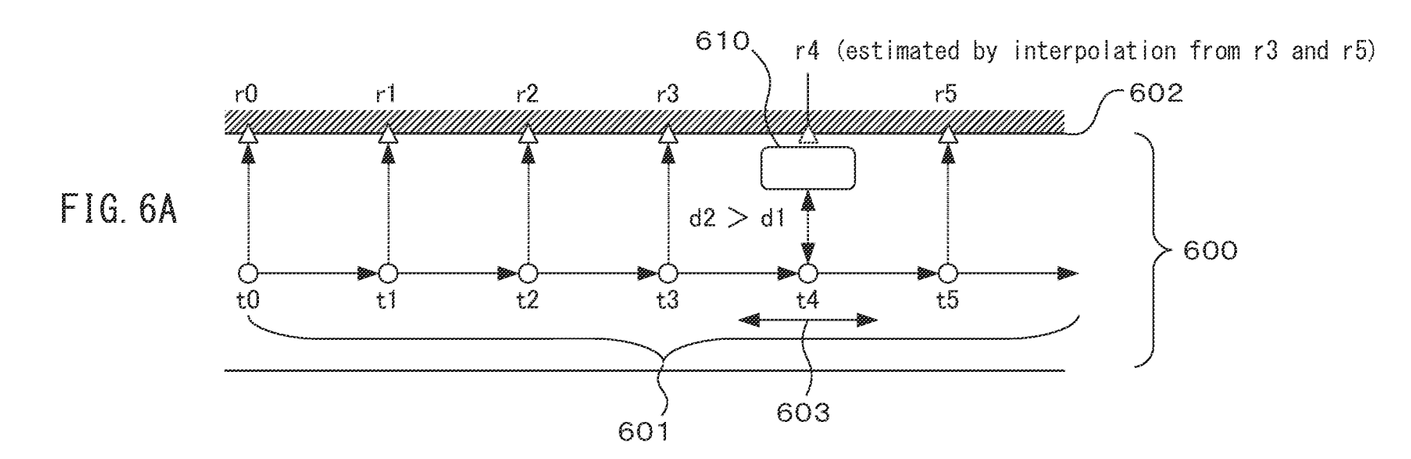
FIG. 6A illustrates an example of the result of estimation of a road edge for the case where the road edge exists at a position covered by an object.

FIG. 6A illustrates an example of the result of estimation of a road edge for the case where the road edge exists at a position covered by an object. FIG. 6B illustrates an example of the result of estimation of a road edge for the case where no road edge exists at a position covered by an object. In the example illustrated in FIG. 6A, images are generated by the camera 11 at positions corresponding to times t0 to t5, respectively, along a trajectory 601 of the vehicle 2 that traveled a road 600. The positions r0 to r3 and r5 of an edge 602 of the road 600 are detected from the images generated at the times except time t4. However, in the image generated at time t4, the edge 602 of the road 600 is covered by a parked vehicle 610 and thus is not detected. For this reason, the position of the vehicle 2 at time t4 is in an undetected section 603. In this example, the distance d1 from the parked vehicle 610 to the trajectory 601 (i.e., the distance from the parked vehicle 610 to the vehicle 2) is less than the distance d2 from the trajectory 601 to the edge 602 of the road 600 in the sections in front of and behind the undetected section 603. For this reason, it is determined that the road 600 in the undetected section 603 has a structure with an edge. Thus the position r4 of the edge 602 of the road 600 in the undetected section 603 is estimated by interpolation from the positions r3 and r5 of the edge 602 in the next and previous sections.

Figure 6B:
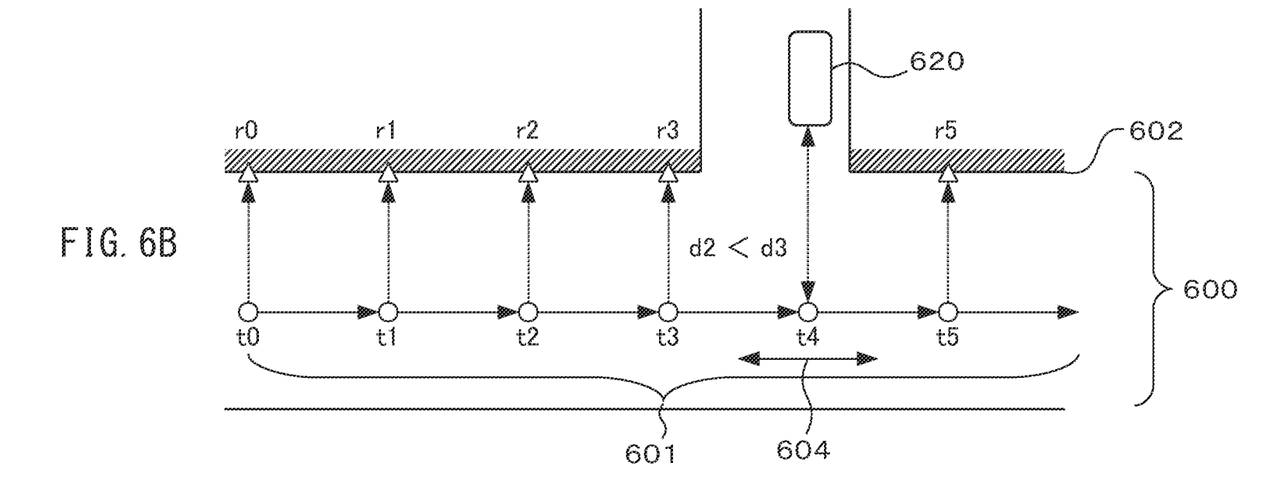
FIG. 6B illustrates an example of the result of estimation of a road edge for the case where no road edge exists at a position covered by an object.

In the example illustrated in FIG. 6B also, images are generated by the camera 11 at positions corresponding to times t0 to t5, respectively, along a trajectory 601 of the vehicle 2 that traveled a road 600. The positions r0 to r3 and r5 of an edge 602 of the road 600 are detected from the images generated at the times except time t4. In the image generated at time t4, the edge 602 of the road 600 is not represented because the area captured by the camera 11 at time t4 includes an intersection. For this reason, the position of the vehicle 2 at time t4 is in an undetected section 604. However, in this example, a stopped vehicle 620 is represented on another road crossing the road 600 in the image generated at time t4. For this reason, the distance d3 between the vehicle 620 detected from the image generated at time t4 and the trajectory 601 is greater than the distance d2 from the trajectory 601 to the edge 602 of the road 600 in the sections in front of and behind the undetected section 604. This results in determination that the road 600 in the undetected section 604 has a structure without an edge. Thus the position of the edge 602 of the road 600 in the undetected section 604 is not estimated by interpolation and is kept undetected.

The road edge estimation unit 45 notifies the map update unit 46 of the result of estimation of the position of the road edge in the undetected section or information indicating that interpolation is not executed.

The map update unit 46 adds the position of an individual road edge estimated or interpolated in the predetermined section to map information to be generated or updated, or rewrites the position in the map information. Regarding an undetected section in which the road is determined to have a structure without an edge, the map update unit 46 does not add the position of a road edge to the map information. This prevents the position of a road edge from being erroneously added to map information in a section without a road edge. The map update unit 46 may further add the type and the position of a feature detected in the predetermined section to the map information, or rewrite them in the map information.

Figure 7:
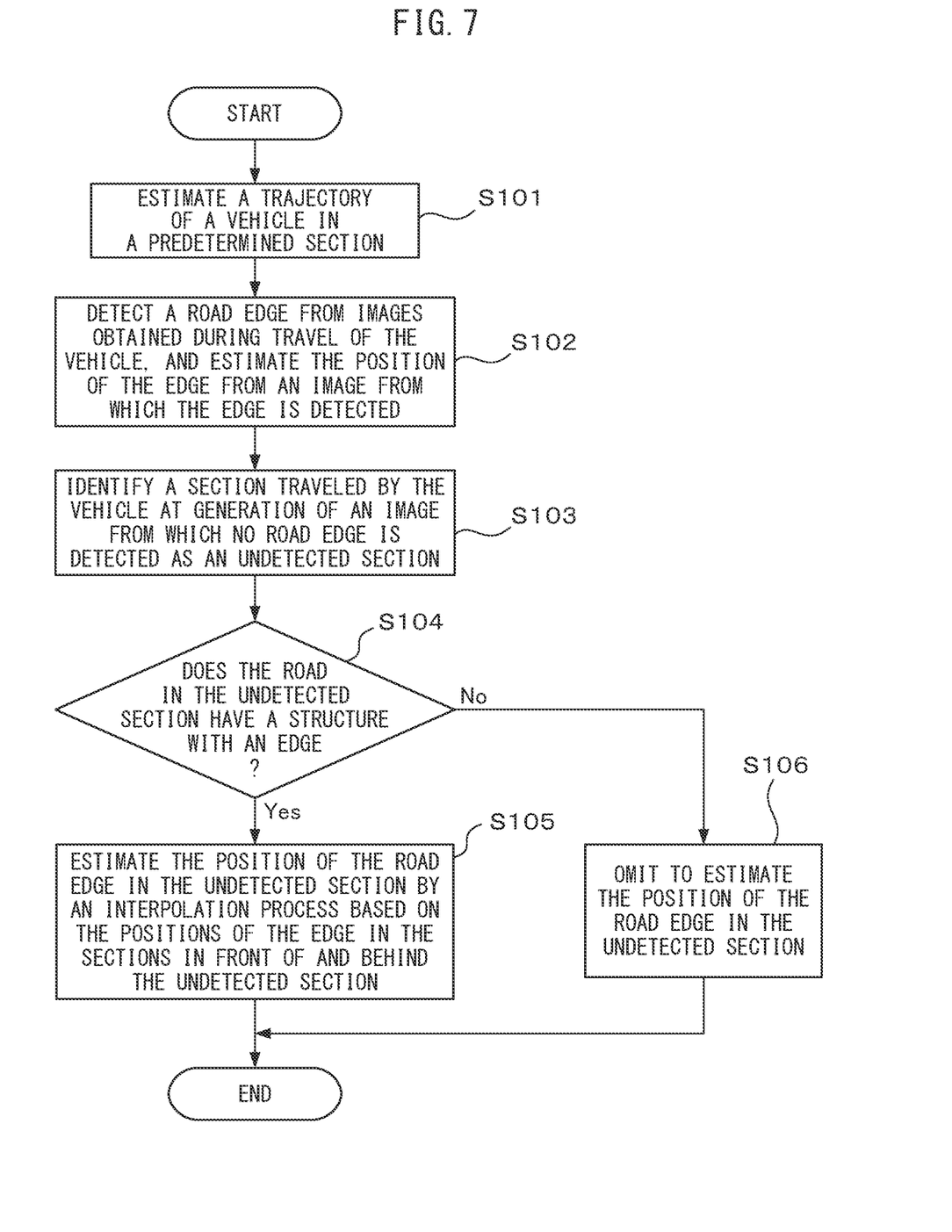
FIG. 7 is an operation flowchart of the road edge estimation process.

FIG. 7 is an operation flowchart of the road edge estimation process by the server 3. When feature data and travel information is received from the vehicle 2 regarding a predetermined section in a collection target region, the processor 34 of the server 3 executes the road edge estimation process in accordance with the operation flowchart described below.

The trajectory estimation unit 41 of the processor 34 estimates the trajectory of the vehicle 2 in the predetermined section (step S101). The position estimation unit 42 of the processor 34 detects a road edge in the predetermined section from each of a series of images generated by the camera 11 during travel of the vehicle 2 through the predetermined section. The position estimation unit 42 then estimates the position of the edge from an image from which the edge is detected (step S102). The section identification unit 43 of the processor 34 identifies a section traveled by the vehicle 2 at generation of an image from which no road edge is detected as an undetected section (step S103).

The road structure determination unit 44 of the processor 34 determines whether the road in the undetected section has a structure with an edge (step S104). When the road in the undetected section has a structure with an edge (Yes in step S104), the road edge estimation unit 45 of the processor 34 executes an interpolation process based on the positions of the road edge in the sections in front of and behind the undetected section along the trajectory. In this way, the road edge estimation unit 45 estimates the position of the road edge in the undetected section (step S105).

When the road in the undetected section has a structure without an edge (No in step S104), the road edge estimation unit 45 omits to estimate the position of the road edge in the undetected section and determines that the road edge does not exist (step S106). After step S105 or S106, the processor 34 terminates the road edge estimation process.

As has been described above, the apparatus for estimating a road edge identifies a section traveled by the vehicle at generation of an image from which no road edge is detected as an undetected section. The apparatus then determines whether the road in the undetected section has a structure with an edge, based on the image from which no road edge is detected, the position of the vehicle at generation of the image, or the motion of the vehicle in the undetected section. When the road in the undetected section has a structure with an edge, the apparatus estimates the position of the road edge in the undetected section by interpolation based on the positions of the road edge in front of and behind the traveled section along the trajectory of the vehicle. When the road in the undetected section has a structure without an edge, the apparatus omits to estimate the position of the road edge in the undetected section. For this reason, the apparatus can prevent setting an erroneously estimated position of a road edge for a place without a road edge. Regarding a road edge in a section that is not represented in an image for some reason, the apparatus can estimate the position of the road edge appropriately, based on the positions of the road edge in the next and previous sections. Thus the apparatus can appropriately estimate the position of a road edge at a place that cannot be seen from a camera mounted on a vehicle.

According to a modified example, the processor 23 of the data acquisition device 15 may execute the road edge estimation process, instead of the processor 34 of the server 3. In this case, the data acquisition device 15 transmits information indicating the result of estimation of a road edge to the server 3 via the wireless communication terminal 14. Alternatively, the ECU of the vehicle 2 may execute the road edge estimation process. In this case, the ECU can control the vehicle 2 so that the vehicle 2 travels with a certain distance maintained from a road edge, based on an estimated position of the road edge.

The computer program for causing a computer to achieve the functions of the units included in the processor of the apparatus for estimating a road edge according to the embodiment or modified examples may be provided in a form recorded on a computer-readable medium. The computer-readable medium may be, for example, a magnetic medium, an optical medium, or a semiconductor memory.

As described above, those skilled in the art may make various modifications according to embodiments within the scope of the present invention.

What is claimed is:

1. An apparatus for estimating a road edge, comprising:
    a processor configured to:
        estimate a trajectory of a vehicle, based on: i) a sensor signal obtained by a sensor for sensing motion of the vehicle mounted on the vehicle or ii) an output of a position-determining device mounted on the vehicle,
        estimate an edge position of an edge of a road traveled by the vehicle, based on an image representing the edge of the road, the image being one of images generated during travel of the vehicle by a camera mounted on the vehicle,
        identify an undetected section traveled by the vehicle when an image, of the images, from which the edge of the road is not detected was generated,
        determine whether the road in the undetected section has a structure with an edge, based on a vehicle position of the vehicle at a time of generation of the image in the undetected section, the image generated in the undetected section, or the motion of the vehicle in the trajectory corresponding to the undetected section,
        estimate the edge position of the edge of the road in the undetected section by interpolation based on the respective edge positions in front of and behind the undetected section along the trajectory when the road in the undetected section has a structure with an edge, wherein the interpolation estimates an estimated edge position between a first edge position and a second edge position, the first edge position and the second edge position being, respectively, the edge positions in front of and behind the undetected section, and
        omit to estimate the edge position of the edge of the road in the undetected section when the road in the undetected section has a structure without an edge.

2. The apparatus according to claim 1, wherein the processor detects another vehicle in the direction from the vehicle toward the edge of the road in front of or behind the undetected section from the image generated in the undetected section, estimates the distance from the vehicle to the detected vehicle, and determines that the road in the undetected section has a structure without an edge, when the estimated distance to the detected vehicle is greater than the distance from the vehicle to the edge of the road in front of or behind the undetected section.

3. The apparatus according to claim 1, further comprising a memory configured to store map information representing the structure of the road in the undetected section, wherein
    the processor determines that the road in the undetected section has a structure without an edge, when in the map information a space that the vehicle is allowed to enter is represented outside the road traveled by the vehicle in the undetected section.

4. The apparatus according to claim 1, wherein the processor determines that the road in the undetected section has a structure without an edge, when the trajectory indicates that the vehicle stopped for a predetermined period or more in the undetected section or the immediately preceding section of the undetected section with an ignition switch kept ON.

5. The apparatus according to claim 1, wherein the processor determines that the road in the undetected section has a structure without an edge, when a travel direction of the vehicle in the undetected section differs from the travel direction of the vehicle in the immediately preceding section of the undetected section by a predetermined angle or more.

6. The apparatus according to claim 1, wherein the processor determines that the road in the undetected section has a structure without an edge, when the vehicle position in the undetected section indicated by the trajectory is further from the road than a line connecting the positions of the edge of the road in the sections in front of and behind the undetected section.

7. The apparatus according to claim 1, wherein the processor determines that the road in the undetected section has a structure without an edge, when a traffic light, a stop line, or a crosswalk is detected from the image generated in the undetected section.

8. A method for estimating a road edge, the method comprising:
  estimating a trajectory of a vehicle, based on: i) a sensor signal obtained by a sensor for sensing motion of the vehicle mounted on the vehicle or ii) an output of a position-determining device mounted on the vehicle,
  estimating an edge position of an edge of a road traveled by the vehicle, based on an image representing the edge of the road, the image being one of images generated during travel of the vehicle by a camera mounted on the vehicle,
  identifying an undetected section traveled by the vehicle when an image, of the images, from which the edge of the road is not detected was generated,
  determining whether the road in the undetected section has a structure with an edge, based on a vehicle position of the vehicle at a time of generation of the image in the undetected section, the image generated in the undetected section, or the motion of the vehicle in the trajectory corresponding to the undetected section,
  estimating the edge position of the edge of the road in the undetected section by interpolation based on the respective edge positions in front of and behind the undetected section along the trajectory when the road in the undetected section has a structure with an edge,
  wherein the interpolation estimates an estimated edge position between a first edge position and a second edge position, the first edge position and the second edge position being, respectively, the edge positions in front of and behind the undetected section, and
  omitting to estimate the edge position of the edge of the road in the undetected section when the road in the undetected section has a structure without an edge.

9. A non-transitory recording medium that stores a computer program for estimating a road edge, the computer program causing a computer to execute a process comprising:
  estimating a trajectory of a vehicle, based on: i) a sensor signal obtained by a sensor for sensing motion of the vehicle mounted on the vehicle or ii) an output of a position-determining device mounted on the vehicle,
  estimating an edge position of an edge of a road traveled by the vehicle, based on an image representing the edge of the road, the image being one of images generated during travel of the vehicle by a camera mounted on the vehicle,
  identifying an undetected section traveled by the vehicle when an image, of the images, from which the edge of the road is not detected was generated,
  determining whether the road in the undetected section has a structure with an edge, based on a vehicle position of the vehicle at a time of generation of the image in the undetected section, the image generated in the undetected section, or the motion of the vehicle in the trajectory corresponding to the undetected section,
  estimating the edge position of the edge of the road in the undetected section by interpolation based on the respective edge positions in front of and behind the undetected section along the trajectory when the road in the undetected section has a structure with an edge,
  wherein the interpolation estimates an estimated edge position between a first edge position and a second edge position, the first edge position and the second edge position being, respectively, the edge positions in front of and behind the undetected section, and
  omitting to estimate the edge position of the edge of the road in the undetected section when the road in the undetected section has a structure without an edge.

* * * * *